Jan. 28, 1964    C. A. DEHNE    3,119,347
BUMPER CONSTRUCTIONS FOR FLOOR TRUCKS OF DRIVELINE SYSTEMS
Filed May 4, 1962    2 Sheets-Sheet 1
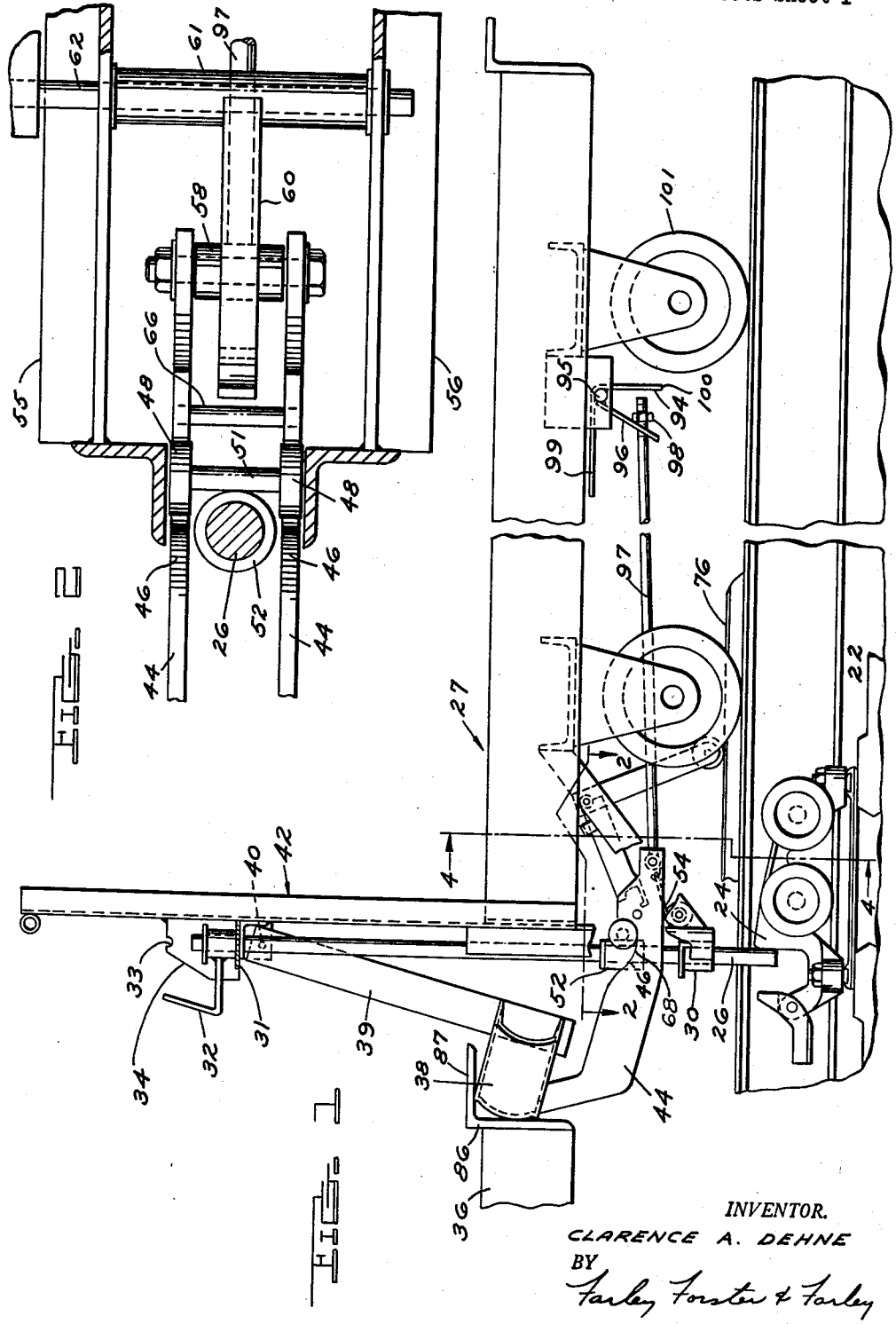
INVENTOR.
CLARENCE A. DEHNE
BY Farley, Forster & Farley
ATTORNEYS Jan. 28, 1964   C. A. DEHNE   3,119,347
BUMPER CONSTRUCTIONS FOR FLOOR TRUCKS OF DRIVELINE SYSTEMS
Filed May 4, 1962   2 Sheets-Sheet 2
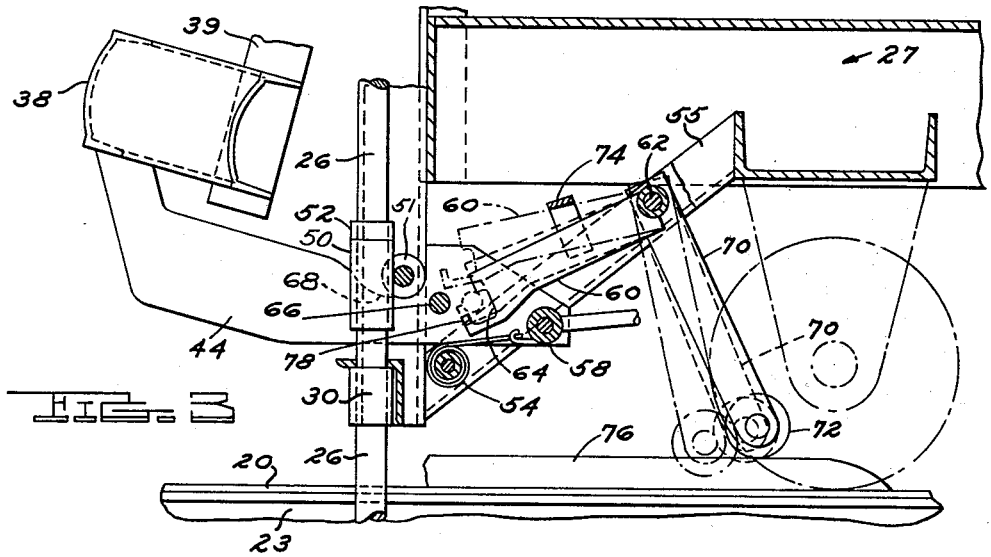
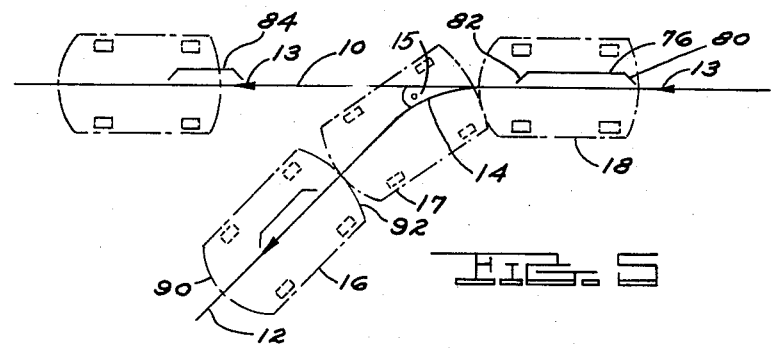
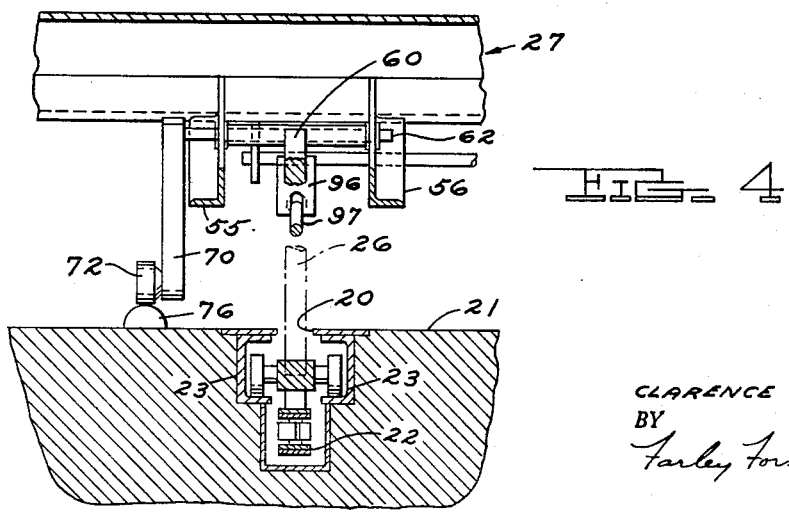
INVENTOR.
CLARENCE A. DEHNE
BY
Farley Forster & Farley
ATTORNEYS

United States Patent Office 3,119,347
Patented Jan. 28, 1964

3,119,347
BUMPER CONSTRUCTIONS FOR FLOOR TRUCKS OF DRIVELINE SYSTEMS
Clarence A. Dehne, Garden City, Mich., assignor to Jervis B. Webb Company, Detroit, Mich., a corporation of Michigan
Filed May 4, 1962, Ser. No. 192,543
10 Claims. (Cl. 104—172)

This invention relates to improved bumper constructions for floor trucks of driveline systems, which constructions have particular utility at a junction between a main and a spur line for enabling a floor truck diverted from the main line to the spur line to be pushed through the junction by a following truck.

Floor truck driveline systems to which the subject matter of the invention generally pertains, are of the type having a powered main line including a guide slot and propelling members operating therein, a spur line guide slot, and a non-powered junction between the main and spur lines including diverting means at the junction—the term "non-powered" meaning that there is no propelling member for moving the drive pin of a diverted floor truck through the junction between the main and spur lines. Power for propelling a diverted truck through the junction is supplied from the main line propelling member through a following truck which engages the diverted truck and pushes it through the junction. These systems are sometimes described as incorporating "bump-off switching."

The object of the present invention is in general to increase the utility of bump-off switching systems with bumper constructions which improve the pushing action, together with means which permit such pushing action to be obtained from floor trucks incorporating automatic drive pin releasing means normally operable to cause the floor truck drive pin to be moved from engagement to a position of disengagement with the propelling member in response to contact between the truck and an object in the path of travel. Such drive pin releasing mechanism usually includes a movably mounted front bumper on the floor truck. When this bumper is moved due to striking an object in the path of travel, such as a preceding truck, suitable mechanism on the truck translates the bumper movement into movement of the drive pin to a position of disengagement from the main line propelling member.

A further object of the present invention is to provide means for disabling the drive pin release mechanism at selected locations along the powered main line, and particularly at junctions between the main line and spur lines so that a diverted truck may be pushed through a junction by a following truck, thereby retaining the safety and accumulation features of the drive pin release mechanism elsewhere in the system.

According to the present invention, disabling of the drive pin releasing mechanism is accomplished by a lock-out member mounted on the floor truck for movement from an inoperative position to an operative position in which this lock-out member prevents normal operation of the drive pin disengaging means, together with means for moving the lock-out member to opeartive position and holding it therein at selected locations along the main line path of travel. In the preferred form of construction to be described herein, the means for moving the lock-out member to operative position includes an actuating arm which depends from the floor truck and a raised cam-like surface mounted in the path of floor truck travel and engageable by the actuating arm.

Other preferred features and advantages of the invention will appear from the following description of the representative embodiment thereof disclosed in the accompanying drawings which consist of the following views:

FIGURE 1, a side elevation, partly in section, showing a floor truck equipped with the improved bumper construction of the invention being propelled by a sub floor drive line;

FIGURE 2, an enlarged sectional plan view taken as indicated by the line 2—2 of FIG. 1;

FIGURE 3, an enlarged sectional elevation of the front end of the truck shown in FIG. 1;

FIGURE 4, a transverse sectional elevation taken as indicated by the line 4—4 of FIG. 1; and FIGURE 5, a schematic plan view showing a junction between a main and spur line.

Referring first to FIG. 5, a powered main drive line is indicated by the line 10, a non-powered spur line by the line 12, the main line being provided with a propelling member for moving floor trucks in the direction of the arrow 13. No propelling member is provided for the spur line 12—at least in the region of the junction 14 between the main and spur lines where some form of diverting means such as a switch 15 is provided for selectively switching trucks, such as the trucks 16 and 17, onto the spur line. Movement of a diverted truck through the junction is obtained by power from the main propelling member transmitted through a following truck, hence, as shown in FIG. 5, both trucks 16 and 17 are being bumped by a following truck 18, which will be assumed to be a non-diverted truck, off onto the spur line 12 out of the main line path of travel as the truck 18 proceeds through the junction.

The present invention increases the usefulness of bump-off switching by making it possible to incorporate the accumulation and safety features of a bumper actuated drive pin release mechanism, in combination with improved bumper designs which permit a greater number of trucks to be pushed onto a spur line without causing a truck being pushed to be overturned and without causing the drive pin of the truck which is doing the pushing to become disengaged due to the reaction upon it.

As shown in FIGS. 1 and 4, the main line 10 includes a guide slot 20 in the floor 21, and a driven propelling chain 22 suspended from trolleys which travel on tracks 23, some of the trolleys being equipped with a pusher 24 for engaging the lowered drive pin 26 of a floor truck 27 as shown in FIG. 1. Drive pin 26 is of conventional construction. It is vertically slidable in guides 30 and 31 and may be manually raised and lowered by a handle 32 and held in raised or disengaged position by placing the handle within a notch 33 on a bracket 34.

Drive pin 26 may also be moved to a disengaged position from a pusher 24, but not with the guide slot 20, by releasing means normally acting in response to contact between the floor truck 27 and an object in the path of travel such as a stopped preceding truck 36 (FIG. 1). The drive pin releasing means shown is actuated by a front bumper 38 movably suspended by members 39 pivoted at 40 to the truck structure 42. A pair of arms 44 extend rearwardly from the bumper, straddle the drive pin 26 as shown in FIG. 2, and are each provided with a cam surface 46 engaged by one of a pair of rollers 48 secured to a drive pin encircling sleeve 50 through the roller axle 51. The upper end of the sleeve 50 engages a collar 52 fixed to the drive pin 26. A return spring 54 is mounted between the frame members 55 and 56 (FIG. 2) which form part of the structure for supporting the lower drive pin guide 30, the return spring being connected to the spacer 58 mounted between the bumper arms 44 and acting to normally urge the bumper to the position shown in FIGS. 1 and 3.

In FIG. 1, the bumper 38 is shown at the moment of contact with the rear end of a preceding stopped truck 36, and normally, further forward movement of the truck 27 will be accompanied by relative rearward movement of the bumper on the truck, causing the rollers 48 to move up the cam surfaces 46 on the arms 44 and thus producing upward movement of the drive pin 26 to a disengaged position by engagement between the sleeve 50 and collar 52.

The present invention provides means whereby a floor truck equipped with a drive pin releasing bumper mechanism of the type described may be employed for bump-off switching. In the construction illustrated this means includes a bumper locking member 60 which is secured to a sleeve 61 in turn fixed to a shaft 62 carried between the frame members 55 and 56 as shown in FIG. 2, thereby mounting the bumper locking member 60 for movement between a normal inoperative position shown in dash line in FIG. 3 and an operative position shown in solid line. In the operative position of the bumper locking member 60, a recessed latch-like portion 64 at the front end thereof lies in the path of movement of a pin 66 carried between the bumper arms 44 and the extent of movement of the bumper 38 and bumper arms 44 necessary to place the pin in engagement with the bumper locking member 60 finds its counterpart in the length of the flat portion 63 of the cam surfaces 46 on the bumper arms 44. Thus if the floor truck strikes an object while the bumper locking member 60 is in its operative position, no upward movement of the drive pin accompanies the initial rearward bumper movement necessary to place the lock pin 66 in engagement with the end portion 64 of the locking member 60.

Movement of the locking member between inoperative and operative positions is controlled by actuating means including: (a) an arm 70 secured to one end of the shaft 62 and extending downwardly and rearwardly so that the weight of the arm 70 and of the roller follower 72 at the lower end thereof counteracts the weight of the bumper locking member 60 and normally moves it to the inoperative dash line position which is defined by a stop bar 74; and (b) a cam-like actuating member 76 mounted on the floor in the path of travel of the floor truck for engagement by the roller 72 on the actuating arm 70 at any location where it is desired to render the drive pin release mechanism inoperative.

When the roller follower engages the cam member 76, as shown in FIG. 3, the actuating arm 70 is moved counterclockwise producing a corresponding movement of the bumper locking member 60 to the full line position where the portion 64 thereof lies in the path of motion of the lock pin 66.

The bumper locking member 60 is also provided with a hook-like latch portion 78 at the forward end thereof, and the overall operation is as follows: Referring to FIGS. 1, 3 and 5, an actuating cam 76 is mounted so that its initial portion 80 in the direction of travel lies in advance of the junction 14 to an extent slightly greater than a truck length so that any truck approaching the junction has its bumper locking member 60 moved to operative position as it passes over the cam 76. If the truck should at this time engage the rear of a preceding diverted truck, such as the truck 36 in FIG. 1, the bumper will move rearwardly into engagement with the bumper locking member, rendering the drive pin release mechanism inoperative and enabling the following truck 27 to push the preceding diverted truck 36 out of the path of travel.

The actuating cam 76 terminates at 82 short of the junction, in order to not obstruct passage of the wheels of a diverted truck, so that the roller follower 72 rolls off the end 82 of the actuating cam before the preceding diverted truck is out of the path of travel. When this occurs, the bumper 38 of the following truck 37 will still be engaging the rear of the preceding diverted truck thus urging the lock pin 66 into engagement with the recessed portion 64 at the end of the locking member 60. As the roller follower rolls off the actuating cam 76, the actuating arm 70 is free to drop down to the position shown in dotted line, FIG. 3, thus moving the locking member 60 to its dotted line position in which the hook portion 78 thereof is engaged with the lock pin 66. This construction provides the means for retaining the bumper locking member in locking engagement and operative position after the truck has passed over the actuating cam and insures that the drive pin release mechanism will remain disabled during the switching operation.

The drive pin release mechanism and the locking member are both returned to their normal positions by a reset cam 84 (FIG. 5) installed along the path of travel after the junction at a distance spaced far enough therefrom so as to insure the completion of the switching operation. When the roller follower contacts the reset cam 84, the actuating arm and locking member 60 are moved back to their full line position of FIG. 3, thus releasing the hook-like portion 78 of the locking member from engagement with the locking pin 66 and enabling the return spring 54 to move the bumper mechanism back to its normal position shown in FIG. 1. When the roller follower 72 rolls off the release cam 84, the actuating arm will return the locking member 60 to normal, inoperative position.

Other features are provided by the invention to improve the bump-off switching operation. As shown in FIG. 1, the rear bumper 86 of a truck may be equipped with a rearwardly extending horizontal flange 87 located to overlap the front bumper 38 of a following truck. This provides a portion of the weight of the preceding truck 36, and any load carried thereby, to aid in preventing the following pushing truck 27 from rearing up thereby disengaging its drive pin 26 from the propelling line pusher 24. Such a rearing up action can readily take place, especially when a following unloaded truck is employed to bumpoff more than one preceding loaded truck.

A further improvement can be obtained by employing front and rear bumper contours such as shown in FIG. 5. The trucks schematically illustrated in this view are each provided with a front bumper 90 (such as the bumper 38 previously described) which is formed in a horizontal curve approximately about the drive pin as a center. Similarly, each of the trucks is provided with a rear bumper 92 also curved on a radius using the drive pin as an approximate center. The result of this bumper configuration is to transmit reaction forces between trucks to the drive pin of each, thereby reducing transverse reaction forces which tend to overturn a truck being pushed.

Another feature is the provision of an anti-backup member 94 (FIG. 1) which acts to prevent recoil or rearward movement of a truck upon engagement with a stopped truck, but which does not interfere with truck movement in a forward direction.

The anti-backup member 94 is secured to a shaft 95 as also is an arm 96. A link 97 is secured to the spacer 58 on the bumper arms 44 and extends loosely through a slot in the arm 96, an adjusting nut 98 being mounted on the rear end of the link 97. When the bumper mechanism is in the normal position shown in FIG. 1, the nut 98 engages the rear face of the arm 96 and holds the anti-backup member 94 in the position shown. When the bumper moves to drive pin releasing position, the link 97 also moves rearwardly, disengaging the nut 98 from the arm 96 and permitting the counterbalancing portion 99 of the member 94 to produce counterclockwise movement thereof as the parts are shown in FIG. 1, placing the lower edge 100 of the anti-backup member 94 in engagement with the periphery of the rubber tired truck wheel 101. Any backward or clockwise movement of the wheel 101 will result in the edge 100 digging into the tire. Forward, or counterclockwise wheel movement will not be affected, and hence a truck such as the truck 17 in FIG. 5 sandwiched between the trucks 16 and 18 does not offer any increased resistance to being pushed by the truck 18.

While preferred embodiments have been described above in detail, it will be understood that numerous modifications might be resorted to without departing from the scope of the invention as defined in the following claims.

I claim:

1. A floor truck drive line system having a powered main line including a guide slot and propelling members operating therein, a non-powered spur line including a guide slot and means at a switch zone for diverting a floor truck from the main to the spur line, the floor trucks each being equipped with a drive pin engageable with a propelling member and drive pin releasing means normally operable to move the drive pin to a non-driving position in response to contact between a floor truck and the rear of a preceding truck, characterized by
   (a) means for disabling the drive pin releasing means whereby a floor truck diverted onto a spur line may be pushed out of the main line path of floor truck travel by a following non-diverted floor truck comprising
   (b) a lock-out member mounted on a floor truck for movement from an inoperative position to an operative position in which said member prevents normal operation of the drive pin releasing means,
   (c) actuating means for moving said lock-out member to operative position in advance of a switch zone and holding it therein along the main line path of travel through the switch zone and
   (d) means for resetting said lock-out member to inoperative position following the switch zone.

2. A floor truck drive line system incorporating bump-off switching between a main and a spur line and wherein drive pin equipped floor trucks are each provided with a front bumper and drive pin disengaging mechanism operated thereby, characterized by:
   (a) means for disabling the drive pin disengaging mechanism in a switching zone whereby a floor truck diverted onto a spur line can be pushed by the bumper of a following truck out of the main line path of travel comprising
   (b) a locking member movably mounted on each floor truck,
   (c) means normally urging said locking member from an operative position to an inoperative position
   (d) a second locking member carried by the drive pin disengaging mechanism and engageable with the first locking member when the first locking member is in the operative position thereof to prevent normal functioning of the drive pin disengaging mechanism,
   (e) actuating cam means mounted in the path of floor truck travel in advance of the switching zone and
   (f) follower means carried by a floor truck for moving the first locking member to the operative position thereof in response to engagement with said actuating cam means.

3. A floor truck drive line system according to claim 2 further characterized by means for latching the first and second locking members in engaged position, and resetting cam means mounted in the path of floor truck travel following the switching zone, said latching means being releasable in response to engagement between said follower means and said resetting cam means.

4. A floor truck drive line system according to claim 2 further characterized by the floor truck front bumper being curved about the floor truck drive pin as an approximate center.

5. A floor truck drive line system according to claim 2 further characterized by each floor truck being provided with a rear bumper which is curved about the floor truck drive pin as an approximate center.

6. A floor truck drive line system according to claim 2 further characterized by each floor truck being provided with a rear bumper including a rearwardly projecting substantially horizontal flange positioned at a level such as to overlap the top of the front bumper of a following truck.

7. A floor truck drive line system according to claim 2 further characterized by each floor truck being provided with an anti-backup member, means normally urging the anti-backup member into contact with the periphery of a truck wheel for biting engagement therewith upon reverse wheel rotation and sliding engagement with the wheel periphery upon forward wheel rotation.

8. A floor truck drive line system incorporating bump-off switching between a main and a spur line and wherein drive pin equipped floor trucks are each provided with a movable front bumper and drive pin disengaging mechanism normally operable in response to bumper movement to release the drive pin from the drive line characterized by means for disabling the drive pin releasing mechanism at a switching zone whereby a diverted floor truck may be pushed onto a spur line and out of the path of main line travel through engagement by the bumper of a following non-diverted floor truck comprising
   (a) a first locking member movably carried by each floor truck
   (b) a second locking member carried by the drive pin disengaging mechanism of each floor truck
   (c) a downwardly depending actuating arm having a follower element at the lower end thereof
   (d) means connecting said follower arm and said first locking member for movement in unison, said follower arm being arranged so that its weight normally urges the first locking member to an inoperative position
   (e) an actuating cam mounted in the path of floor truck travel in advance of the switching zone, said actuating cam being engageable by said follower element on the actuating arm to produce movement of the actuating arm and first locking member to an operative position in which said first locking member is engageable by the second locking member upon initial actuation of said drive pin releasing mechanism
   (f) said actuating cam terminating prior to the end of said switching zone and means for latching said first and second locking members together in response to disengagement between said actuating cam and follower arm
   (g) and a resetting cam mounted in the path of floor truck travel following the switching zone, said resetting cam being engageable by the actuating arm to produce movement thereof to a position in which the latch means are released whereby said actuating arm and first locking member return to inoperative position upon disengagement with the resetting cam.

9. A drive line system floor truck having a drive pin, a movable front bumper, drive pin disengaging mechanism operable in response to bumper movement toward the floor truck to release the drive pin from the drive line, and means for returning the bumper and disengaging mechanism to a normal position, characterized by an anti-backup member movably mounted on the floor truck adjacent a wheel thereof, means normally urging the anti-backup member into contact with the periphery of a truck wheel for biting engagement therewith upon reverse wheel rotation and sliding non-braking engagement with the wheel periphery upon forward wheel rotation, and means operatively connected between the anti-backup member and bumper for holding the anti-backup member out of wheel contact when the bumper is in normal position and for releasing the anti-backup member for normally urged movement into wheel contact in response to bumper movement toward the floor truck.

10. A drive line system floor truck having a drive pin, a movable front bumper, drive pin disengaging mechanism operable in response to bumper movement toward the floor truck to release the drive pin from the drive line, and means for returning the bumper and disengaging mechanism to a normal position, characterized by a transversely extending shaft carried by the floor truck forwardly and above the rear wheels thereof, an anti-backup member secured to said shaft adjacent a rear wheel, said anti-backup member including a portion adapted to contact the wheel periphery for biting engagement therewith upon reverse wheel rotation and sliding non-braking engagement therewith upon forward wheel rotation and a counterbalancing portion normally urging the anti-backup member to wheel contacting position, an arm secured to said shaft, a link secured to the drive pin disengaging mechanism, and adjustable one-way connecting means between said link and arm engageable in response to return bumper movement for moving and holding the shaft and anti-backup member out of wheel contacting position.

References Cited in the file of this patent

UNITED STATES PATENTS

| | | |
|---|---|---|
| 1,578,516 | Headley | Mar. 30, 1926 |
| 1,748,188 | Field | Feb. 25, 1930 |
| 1,824,484 | Jackson | Sept. 22, 1931 |
| 2,308,374 | Long | Jan. 12, 1943 |
| 2,619,370 | Leger | Nov. 25, 1952 |
| 2,738,199 | Rand | Mar. 13, 1956 |